United States Patent
Zhang et al.

(10) Patent No.: US 11,136,444 B2
(45) Date of Patent: Oct. 5, 2021

(54) POLYURETHANES HAVING REDUCED ALDEHYDE EMISSIONS

(71) Applicant: Dow Global Technologies LLC, Midland, MI (US)

(72) Inventors: Jiguang Zhang, Shanghai (CN); Shaoguang Feng, Shanghai (CN); Michael T. Malanga, Midland, MI (US); Zhengming Tang, Shanghai (CN); Wenbin Yao, Shanghai (CN); Degang Zhang, Shanghai (CN); Ping Zhang, Shanghai (CN); Jian Zou, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/487,252

(22) PCT Filed: Feb. 20, 2017

(86) PCT No.: PCT/CN2017/074077
§ 371 (c)(1),
(2) Date: Aug. 20, 2019

(87) PCT Pub. No.: WO2018/148959
PCT Pub. Date: Aug. 23, 2018

(65) Prior Publication Data
US 2019/0367695 A1    Dec. 5, 2019

(51) Int. Cl.
*C08J 9/00*    (2006.01)
*C08G 18/18*   (2006.01)
*C08G 18/40*   (2006.01)
*C08G 18/48*   (2006.01)
*C08G 18/63*   (2006.01)
*C08G 18/76*   (2006.01)
*C08J 9/04*    (2006.01)
*C08K 5/103*   (2006.01)
*C08K 5/134*   (2006.01)
*C08G 101/00*  (2006.01)

(52) U.S. Cl.
CPC ........ *C08J 9/0023* (2013.01); *C08G 18/1808* (2013.01); *C08G 18/4072* (2013.01); *C08G 18/485* (2013.01); *C08G 18/632* (2013.01); *C08G 18/7614* (2013.01); *C08G 18/7671* (2013.01); *C08J 9/04* (2013.01); *C08K 5/103* (2013.01); *C08K 5/1345* (2013.01); *C08G 2101/00* (2013.01); *C08J 2201/022* (2013.01); *C08J 2375/06* (2013.01)

(58) Field of Classification Search
CPC ....... C08J 9/0023; C08J 9/04; C08G 18/1808; C08G 18/485; C08G 18/4072; C08G 18/632; C08G 18/7671; C08K 5/103; C08K 5/1345

See application file for complete search history.

(56) References Cited

U.S. PATENT DOCUMENTS

| | | |
|---|---|---|
| 4,325,863 A | 4/1982 | Hinsken et al. |
| 4,338,244 A | 7/1982 | Hinsken et al. |
| 4,390,645 A | 6/1983 | Hoffman et al. |
| 5,175,312 A | 12/1992 | Dubs et al. |
| 5,216,052 A | 6/1993 | Nesvadba et al. |
| 5,252,643 A | 10/1993 | Nesvadba |
| 5,506,329 A | 4/1996 | Chou et al. |
| 5,552,496 A * | 9/1996 | Vogt-Birnbrich ........... C08G 18/0804 525/440.02 |
| 5,599,884 A | 2/1997 | Beleck |
| 6,646,034 B2 | 11/2003 | Mori et al. |
| 6,881,774 B2 | 4/2005 | Schrinner et al. |
| 2010/0124524 A1 | 5/2010 | Green et al. |
| 2011/0034610 A1 | 2/2011 | Mulholland |
| 2011/0272621 A1* | 11/2011 | Jaffrennou ........... C08G 8/28 252/62 |
| 2011/0300359 A1* | 12/2011 | Blanchard ........... E04F 13/002 428/219 |
| 2012/0184639 A1 | 7/2012 | Haas et al. |
| 2016/0200854 A1* | 7/2016 | Rister, Jr. ........... C07D 233/32 521/128 |
| 2016/0304686 A1 | 10/2016 | Otero Martinez et al. |
| 2018/0371152 A9 | 12/2018 | Otero Martinez et al. |

FOREIGN PATENT DOCUMENTS

| | | |
|---|---|---|
| DE | 4316611 | 11/1993 |
| DE | 4316622 | 11/1993 |
| DE | 4316876 | 11/1993 |
| EP | 0589839 | 3/1994 |
| EP | 0591102 | 4/1994 |
| JP | 200506754 | 1/2005 |
| JP | 2005154599 | 6/2005 |
| JP | 2005179423 | 7/2005 |
| WO | 2006111492 A2 | 10/2006 |
| WO | 2009114329 A2 | 9/2009 |
| WO | 2016/201615 A1 | 12/2016 |

* cited by examiner

*Primary Examiner* — Michael L Leonard

(57) ABSTRACT

Polyurethane foams are made by curing a reaction mixture that contains an aromatic polyisocyanate, at least one isocyanate-reactive material having an average functionality of at least 2 and an equivalent weight of at least 200 per isocyanate-reactive group, at least one blowing agent, at least one surfactant and at least one catalyst, at least one polyacetoacetate compound and least one antioxidant. Foams so produced emit low levels of both formaldehyde and acetaldehyde.

2 Claims, No Drawings

POLYURETHANES HAVING REDUCED ALDEHYDE EMISSIONS

FIELD OF THE INVENTION

This invention relates to polyurethane foams that exhibit reduced levels of formaldehyde and acetaldehyde emissions, and to methods for producing such polyurethane foams.

BACKGROUND OF THE INVENTION

Emissions from polymeric materials are a concern in many applications, especially when people or animals are exposed to the polymeric material within an enclosed space. Materials used in workspace, home and vehicular environments are a particular concern. Vehicle manufacturers are imposing stricter limits on the emissions from polymeric materials that are used in the passenger cabins of cars, trucks trains and aircraft. Aldehyde emissions, especially formaldehyde and acetaldehyde, are a particular cause of concern.

Polyurethane foams are used in many office, household and vehicular applications. They are used, for example, in appliance applications and as cushioning for bedding and furniture. In automobiles and trucks, polyurethanes are used as seat cushioning, in headrests, in dashboards and instrument panels, in armrests, in headliners, and other applications. These polyurethanes often emit varying levels of formaldehyde and acetaldehyde.

Scavengers are sometimes used to reduce aldehyde emissions from various types of materials. In the polyurethane field, there is, for example, WO 2006/111492, which describes adding antioxidants and hindered amine light stabilizers (HALS) to polyols to reduce aldehydes. WO 2009/114329 describes treating polyols with certain types of aminoalcohols and treating polyisocyanates with certain nitroalkanes, in order to reduce aldehydes in the polyols and polyisocyanates, respectively, and in polyurethanes made from those materials. JP 2005-154599 describes the addition of an alkali metal borohydride to a polyurethane formulation for that purpose. U.S. Pat. No. 5,506,329 describes the use of certain aldimine oxazolidine compounds for scavenging formaldehyde from polyisocyanate-containing preparations, and describes nitroalkanes and aminoalcohols as formaldehyde scavengers in textile and plywood applications.

These approaches provide limited benefit, in part because aldehydes present in polyurethane foam are not always carried in from the raw materials used to make the foam. Formaldehyde and acetaldehyde in particular can form during the curing step or when the foam is later subjected to UV light, elevated temperatures or other conditions. Because of the cellular structure of these foams, aldehydes generated in this way often can escape easily into the atmosphere and so can present an exposure concern. Therefore, simply treating the starting materials is not always an adequate solution to the emission of aldehydes from polyurethane foams.

Another problem is that measures that are effective against formaldehyde emissions are not always effective against acetaldehyde emissions, and vice versa. For example, applicants have found that whereas the antioxidants described in WO 2006/111,492 are effective in reducing acetaldehyde emissions, they can actually cause an increase in formaldehyde emissions. Applicants have further found that the presence of HALS often leads to an increase in formaldehyde emissions, acetaldehyde emissions or both. Nonetheless, it is often desirable to include HALS materials in the foam formulation to provide for light stability (apart from any impact on aldehyde emissions). Therefore, a method for overcoming the negative effects of antioxidants and HALS materials on formaldehyde emissions, while preserving their desired benefits of acetaldehyde reduction and light stability, is wanted.

In other arenas, U.S. Pat. No. 6,646,034 and US Publication No. 2011-0034610 describe adding various formaldehyde scavengers, such as organic compounds having amino or imino groups, including certain aminoalcohol compounds and acetoacetamide, to a polyacetal resin. US Publication No. 2010-0124524 describes a method for scavenging airborne formaldehyde with certain amine-functional scavengers. U.S. Pat. No. 5,599,884 describes removing formaldehyde from amino resins using acetoacetamide, among other materials.

An inexpensive and effective method to reduce both formaldehyde and acetaldehyde emissions from polyurethane foams is highly desired. Preferably, this method does not result in a significant change in the properties or performance of the polyurethane.

BRIEF SUMMARY OF THE INVENTION

This invention is a method for producing a polyurethane foam comprising forming a reaction mixture that contains an aromatic polyisocyanate, at least one isocyanate-reactive material having an average functionality of at least 2 and an equivalent weight of at least 200 per isocyanate-reactive group, at least one blowing agent, at least one surfactant and at least one catalyst, and curing the reaction mixture to form the foam in the presence of:

(i) at least one polyacetoacetate, preferably having the structure:

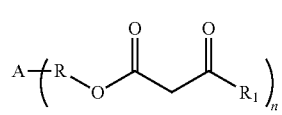

I

A is a polymer backbone, a $C_1$-$C_{20}$ substituted or unsubstituted linear or branched alkyl, aryl, arylalkyl, or alkaryl group wherein the substituents may be one or more O, N, S, halogen, or phosphine;

R is a bond or $C_1$-$C_{30}$ linear or branched alkyl, aryl, arylalkyl, or alkaryl group, preferably a $C_1$ alkyl group or a substituted or unsubstituted ether moiety;

$R^1$ is a substituted or unsubstituted $C_1$-$C_6$ alkyl or a substituted or unsubstituted aryl group, preferably a $C_1$ or $C_2$ alkyl group;

and n is 2 to 100, preferably 2 to 20, more preferably 2 to 10, most preferable 2 to 4, and (ii) at least one antioxidant selected from 1) phenolic compounds such as 2,6-di-tert-butyl-4-methylphenol, benzenepropanoic acid, 3,5-bis (1,1-dimethyl-ethyl)-4-hydroxy-$C_7$-$C_9$ branched alkyl esters, 2) aminic antioxidants such as N,N'-di-isopropyl-p-phenylenediamine, 3) thiosynergists such as dilauryl thiodipropionate, 4) phosphites and phosphonites such as triphenyl phosphite, diphenylalkyl phosphites, 5) benzofuranones and indolinones, 6) other antioxidants such as O-, N- and S-benzyl compounds, triazine compounds, amides of β-(3,5-di-tert-butyl-4-hydroxyphenyl)propionic acid, esters of substituted and unsubstituted benzoic acids, nickel compounds, and esters of β-thiodipropionic acid, or 7) a mixture of two or more above antioxidants.

The invention is also a process for reducing formaldehyde and acetaldehyde emissions from a polyurethane foam, comprising: a) mixing a polyacetoacetate compound (i) and at least one antioxidant (ii) with at least one isocyanate-reactive material having an average functionality of at least 2 and an equivalent weight of at least 200 per isocyanate-reactive group and then b) combining the mixture from step a) with at least one organic polyisocyanate and curing the resulting combination in the presence of at least one blowing agent, at least one surfactant, at least one catalyst and at least one antioxidant to form a polyurethane foam.

The invention is also a polyurethane foam made in either of the foregoing processes.

The invention provides an inexpensive and practical method by which one can produce polyurethane foams that emit very low levels of both formaldehyde and acetaldehyde, preferably a polyurethane foam of which exhibits formaldehyde and acetaldehyde emissions each no greater than 1 µg/100 mm by 80 mm by 50 mm test piece.

DETAILED DESCRIPTION OF THE INVENTION

Polyacetoacetate compounds are known, for example, see JP 200506754 and JP 2005179423 and US Publication No. 2016/0304686, which is incorporated by reference herein in its entirety. As defined herein, a polyacetoacetate compound is a compound containing two or more acetoacetate (—O—C(O)CH$_2$C(O)—) groups. Suitable polyacetoacetate are described by the following structure:

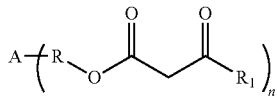

I

A is a polymer backbone, a C$_1$-C$_{20}$ substituted or unsubstituted linear or branched alkyl, aryl, arylalkyl, or alkaryl group wherein the substituents may be one or more O, N, S, halogen, or phosphine;

R is a bond or C$_1$-C$_{30}$ linear or branched alkyl, aryl, arylalkyl, or alkaryl group, preferably a C$_1$ alkyl group or a substituted or unsubstituted ether moiety;

R$^1$ is a substituted or unsubstituted C$_1$-C$_6$ alkyl or a substituted or unsubstituted aryl group, preferably a C$_1$ or C$_2$ alkyl group;

and n is 2 to 100, preferably 2 to 20, more preferably 2 to 10, most preferable 2 to 4, Particularly preferred acetoacetates according to the present invention are trimethylolpropane triacetoacetate, 2,2-bis(((3-oxobutanoyl)oxy)methyl)propane-1,3-diyl bis(3-oxobutanoate), 2-methyl-2-(((3-oxobutanoyl)oxy)methyl) propane-1,3-diyl bis(3-oxobutanoate), 1,2-diethylol diacetoacetate, 2-methyl-2-(((3-oxobutanoyl)oxy)methyl) propane-1,3-diyl bis(3-oxobutanoate), 2-methyl-2-(((3-oxobutanoyl)oxy)methyl)propane-1,3-diyl bis(3-oxobutanoate), 2-methyl-2-(((3-oxobutanoyl)oxy)methyl) propane-1,3-diyl bis(3-oxobutanoate), 2-methyl-2-(((3-oxobutanoyl)oxy)methyl)propane-1,3-diyl bis(3-oxobutanoate) and its isomers, 2-methyl-2-(((3-oxobutanoyl)oxy)methyl)propane-1,3-diyl bis(3-oxobutanoate) and its isomers, any homologs of acetoacetated polypropylene glycol or polyethylene glycol wherein the acetoacetated polypropylene glycol or polyethylene glycol can be linear or branched, acetoacetated branched polyether polyol or polyester polyol, hexane-1,2,3,4,5,6-hexayl hexakis(3-oxobutanoate), propane-1,2,3-triyl tris(3-oxobutanoate, or mixtures thereof.

Preferable polyacetoacetate compounds include, but are not limited, to the following:

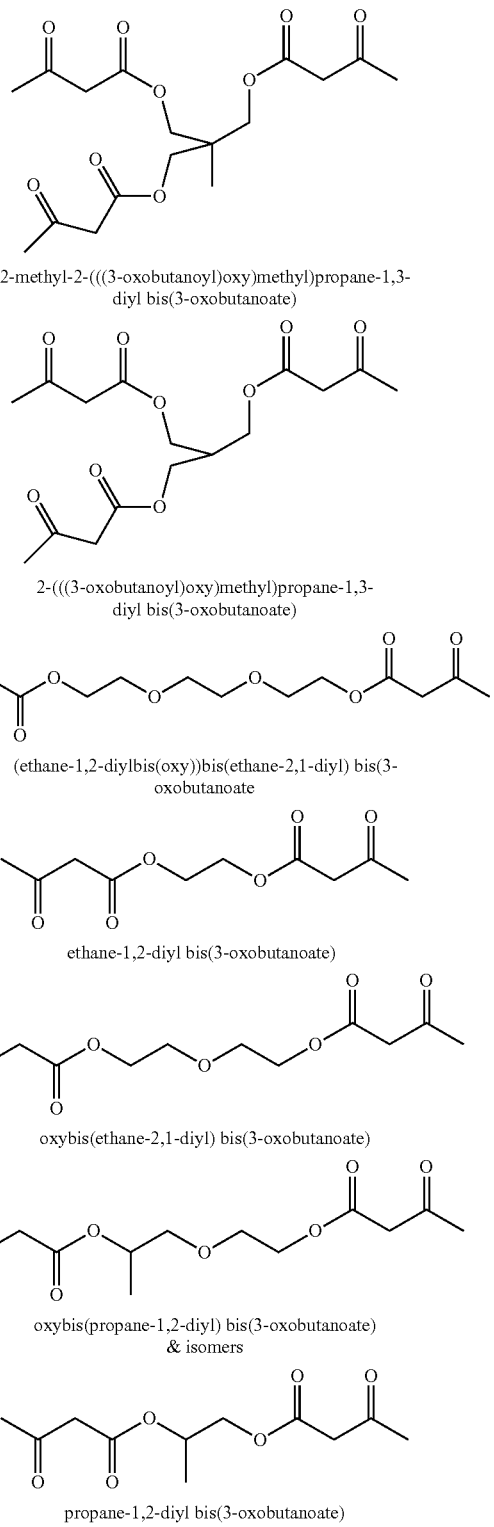

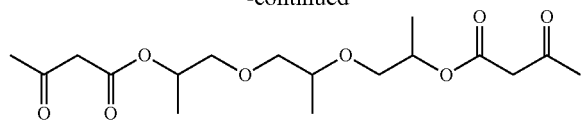

(propane-1,2-diylbis(oxy))bis(propane-1,2-diyl) bis(3-oxobutanoate) & Isomers

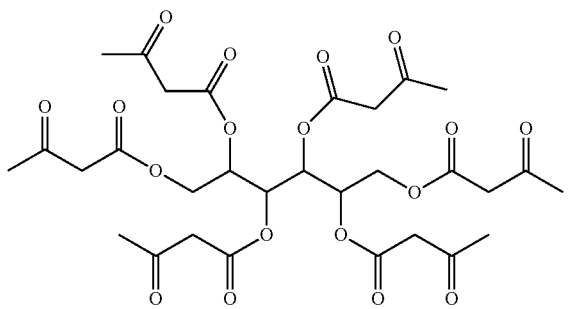

hexane-1,2,3,4,5,6-hexayl hexakis(3-oxobutanoate)

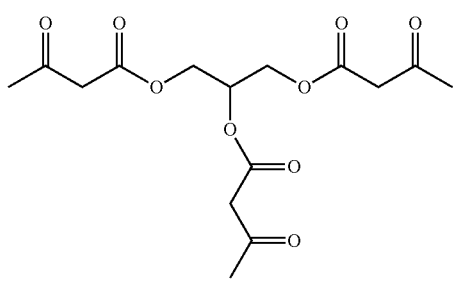

propane-1,2,3-triyl tris(3-oxobutanoate)

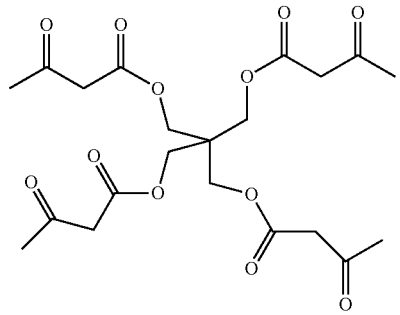

2,2-bis(((3-oxobutanoyl)oxy)methyl)-
propane-1,3-diyl bis(3-oxobutanoate)

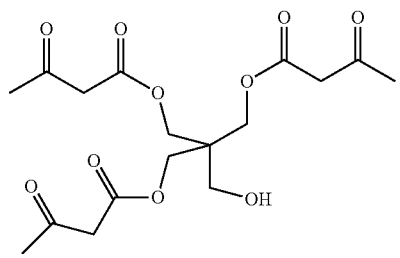

Butanoic acid, 3-oxo-, 1,1'-[2-[(1,3-dioxobutoxy)methyl]-
2-(hydroxymethyl)-1,3-propanediyl] ester

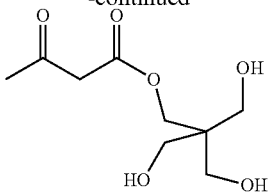

Butanoic acid, 3-oxo-, 3-hydroxy-2,2-
bis(hydroxymethyl)propyl ester

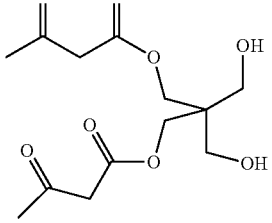

Butanoic acid, 3-oxo-, 1,1'-[2,2-bis(hydroxymethyl)-
1,3-propanediyl] ester

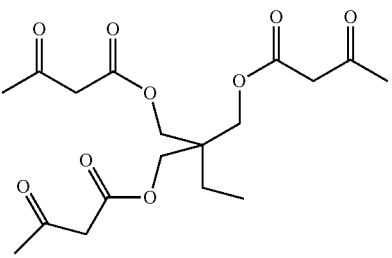

2-ethyl-2-(((3-oxobutanoyl)oxy)methyl)propane-1,3-diyl or
bis(3-oxobutanoate)

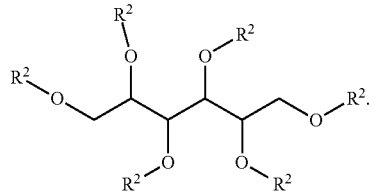

a substituted sorbitol where each $R^2$ is
independently H or –C(O)CH$_2$C(O)H

The process of the invention is performed in the presence of at least one antioxidant (ii). Examples of suitable antioxidants include, for example:

1) Phenolic compounds such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, esters of 0-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of 0-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane, esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2.2.2]octane.

2) Aminic antioxidants such as N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, and the like.

3) Thiosynergists such as dilauryl thiodipropionate or distearyl thiodipropionate.

4) Phosphites and phosphonites such as triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, and 5-butyl-5-ethyl-2-(2,4,6-tri-tert-butylphenoxy)-1,3,2-dioxaphosphirane.

5) Benzofuranones and indolinones such as those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102, including for example 3-[4-(2-acetoxyethoxy)phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-ditert-butylbenzofuran-2-one, 3-(3,4-dimethylphenyl)-5,7-di-tert-butylbenzofuran-2-one, 3-(2,3-dimethylphenyl)-5,7-di-tert-burylbenzofuran-2-one, as well as 6) tocophenols, hydroxylated thiodiphenyl ethers, O-, N- and S-benzyl compounds, hydroxybenzylated malonates, triazine compounds, benzylphosphonates, acylaminophenols, amides of β-(3,5-di-tert-butyl-4-hydroxyphenyl)propionic acid, ascorbic acid (vitamin C), 2-(2'-hydroxyphenyl)benzotriazoles, 2-hydroxybenzophenones, esters of substituted and unsubstituted benzoic acids, acrylates, nickel compounds, oxamides, 2-(2-hydroxyphenyl)-1,3,5-triazines, hydroxylamines, nitrones, and esters of β-thiodipropionic acid, as described, for example, in U.S. Pat. No. 6,881,774, incorporated herein by reference.

Preferred antioxidants include:
a) mixtures of at least one phenolic compound as described in 1) above with at least one phosphite or phosphonite compound as described in 4) above;
b) mixtures of at least one phenolic compound as described in 1) above with at least one benzofuranone or indolinone compound as described in 5) above;
c) mixtures of at least one phenolic compound as described in 1) above with at least one aminic antioxidant as described in 2) above;
d) mixtures of at least one phenolic compound as described in 1) above with at least one phosphite or phosphonite compound as described in 4) above and at least one benzofuranone or indolinone compound as described in 5) above;
e) mixtures of at least one phenolic compound as described in 1) above with at least one phosphite or phosphonite compound as described in 4) above and at least one aminic compound as described in 2) above;
f) mixtures of at least one phenolic compound as described in 1) above with at least one phosphite or phosphonite compound as described in 4) above, at least one benzofuranone or indolinone compound as described in 5) above and at least one aminic compound as described in 2) above;
g) mixtures of at least one phenolic compound as described in 1) above with at least one thiosynergist as described in 3); and
h) any of mixtures a) to f) above with at least one thiosynergist as described in 3).

In some embodiments, a HALS (hindered amine light stabilizer) compound is present. The HALS compound can be used, for example, in conjunction with an antioxidant as described in any of 1)-5) above, or in conjunction with any of mixtures a)-h) above. Suitable HALS compounds include bis(1-octyloxy)-2,2,5,5-tetramethyl-4-piperidinyl) sebacate (TINUVIN™ 123 from BASF), n-butyl-(3,5-di-tert-butyl-4-hydroxylbenzyl)bis-(1,2,2,6-pentamethyl-4-piperidinyl) malonate (TINUVIN 144 from BASF), dimethyl succinate polymer with 4-hydroxy-2-2,6,6-tetramethyl-1-piperidinethanol (TINUVIN 622 from BASF), bis(1,2,2,6,6-pentamethyl-4-piperidinyl) sebacate (TINUVIN 765 from BASF) and bis(2,2,6,6-tetramethyl-4-piperidinyl) sebacate (TINUVIN 770 from BASF) and the like.

The process of the invention is optionally performed in the presence of (iii) a polyamine, for example polyethyleneimine (PEI).

To produce the foam, at least one polyisocyanate is reacted with at least one isocyanate-reactive compound that has a functionality of at least 2 and an equivalent weight of at least 200 per isocyanate-reactive group. "Functionality" refers to the average amount of isocyanate-reactive groups per molecule; the functionality may be as much as 8 or more but preferably is from 2 to 4. The isocyanate groups may be, for example, hydroxyl, primary amino or secondary amino groups, but hydroxyl groups are preferred. The equivalent weight may be up to 6000 or more, but is preferably from 500 to 3000 and more preferably from 1000 to 2000. This isocyanate-reactive compound may be, for example, a polyether polyol, a polyester polyol, a hydroxyl-terminated butadiene polymer or copolymer, a hydroxyl-containing acrylate polymer, and the like. A preferred type of isocyanate-reactive compound is a polyether polyol, especially a polymer of propylene oxide or a copolymer of propylene oxide and ethylene oxide. A copolymer of propylene oxide and ethylene oxide may be a block copolymer having terminal poly(oxyethylene) blocks and at least 50% primary hydroxyl groups. Another suitable copolymer of propylene oxide and ethylene oxide may be a random or pseudo-random copolymer, which may also contain terminal poly(oxyethylene) blocks and at least 50% primary hydroxyl groups.

Polyester polyols that are useful as the isocyanate-reactive compound include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of about 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by The Dow Chemical Company under the trade name "Tone" are also useful.

Mixtures of two or more isocyanate-reactive compounds having a functionality of at least 2 and an equivalent weight of at least 200 per isocyanate-reactive group can be used if desired.

The isocyanate-reactive compound(s) may contain dispersed polymer particles. These so-called polymer polyols contain, for example, particles of vinyl polymers such as styrene, acrylonitrile or styrene-acrylonitrile, particles of a polyurea polymer, or polymers of a polyurethane-urea polymer.

In addition, such isocyanate-reactive compounds can be used in admixture with one or more crosslinkers and/or chain extenders. For purposes of this specification, "crosslinkers" are compounds having at least three isocyanate-reactive groups per molecule and an equivalent weight per isocyanate-reactive group of below 200. "Chain extenders" for purposes of this invention have exactly two isocyanate-reactive groups per molecule and have an equivalent weight per isocyanate-reactive group of below 200. In each case, the isocyanate-reactive groups are preferably hydroxyl, primary amino or secondary amino groups. Crosslinkers and chain extenders preferably have equivalent weights of up to 150 and more preferably up to about 125.

Examples of crosslinkers include glycerin, trimethylolpropane, trimethylolethane, diethanolamine, triethanolamine, triisopropanolamine, alkoxylates of any of the foregoing that have equivalent weights of up to 199, and the like. Examples of chain extenders include alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), ethylene diamine, toluene diamine, diethyltoluene diamine and the like, as well as alkoxylates of any of the foregoing that have equivalent weights of up to 199, and the like.

Examples of suitable polyisocyanates include, for example, m-phenylene diisocyanate, 2,4- and/or 2,6-toluene diisocyanate (TDI), the various isomers of diphenylmethanediisocyanate (MDI), the so-called polymeric MDI products (which are a mixture of polymethylene polyphenylene polyisocyanates in monomeric MDI), carbodiimide-modified MDI products (such as the so-called "liquid MDI" products which have an isocyanate equivalent weight in the range of 135-170), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), isophorone diisocyanate, naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenyl methane-4,4'-diisocyanate, 4,4',4'''-triphenylmethane diisocyanate, hydrogenated polymethylene polyphenylpolyisocyanates, toluene-2,4,6-triisocyanate and 4,4'-dimethyldiphenylmethane-2,2',5,5'-tetraisocyanate. Any of the foregoing that are modified to contain urethane, urea, uretonimine, biuret, allophonate and/or carbodiimide groups may be used.

Preferred isocyanates include TDI. Most preferred isocyanates include MDI and/or polymeric MDI, as well as derivatives of MDI and/or polymeric MDI that contain urethane, urea, uretonimine, biuret, allophanate, and/or carbodiimide groups.

The blowing agent may be a chemical (exothermic) type, a physical (endothermic type) or a mixture of at least one of each type. Chemical types typically react or decompose to produce a carbon dioxide or nitrogen gas under the conditions of the foaming reaction. Water and various carbamate compounds are examples of suitable chemical blowing agents. Physical types include carbon dioxide, various low-boiling hydrocarbons, hydrofluorocarbons, hydroflurochlorocarbons, ethers and the like. Water is most preferred blowing agent, either by itself or in combination with one or more physical blowing agents.

Suitable surfactants are materials that help to stabilize the cells of the foaming reaction mixture until the materials have cured. A wide variety of silicone surfactants as are commonly used in making polyurethane foams can be used in making the foams with the polymer polyols or dispersions of this invention. Examples of such silicone surfactants are commercially available under the tradenames TEGOSTAB™ (Evonik Industries/Goldschmidt and Co.), NIAX™ (GE OSi Silicones) and DABCO™ (Air Products and Chemicals).

Suitable catalysts include those described by U.S. Pat. No. 4,390,645, which is incorporated herein by reference. Representative catalysts include:

(a) tertiary amines, such as trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis, tri(dimethylaminopropyl)amine, pentamethyldiethylenetriamine and triethylenediamine and the like; as well as so-called "low emissive" tertiary amine catalysts that contain one or more isocyanate-reactive groups such as dimethylaminepropylamine and the like;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate; and (h) organometallic derivatives of tetravalent tin, trivalent and pentavalent As, Sb and Bi and metal carbonyls of iron and cobalt.

The amounts of the various ingredients except for the polyisocyanate are conveniently expressed in parts by weight per 100 parts ("pph") by weight of the isocyanate-reactive material(s) having at least two isocyanate-reactive groups and equivalent weight of at least 200 per isocyanate-reactive group.

The polyacetoacetate compound (i) is present in an effective amount, such as from 0.005 to 5 parts by weight based on the total weight of the reactive mixture, preferably from 0.01 to 0.5 and more preferably from 0.025 to 0.25 parts by weight.

The antioxidant(s) (ii) is present in an effective amount, such as from 0.005 to 5 parts by weight based on the total weight of the reactive mixture, preferably from 0.01 to 0.5 and more preferably from 0.025 to 0.25 parts by weight.

If PEI (iii) is present, it is present in an effective amount, such as from 0.005 to 5 parts by weight based on the total weight of the reactive mixture, preferably from 0.01 to 0.5 and more preferably from 0.025 to 0.25 parts by weight.

Preferably, the amount of the polyacetoacetate (i) and antioxidant (ii) combined is from 0.005 to 5 parts by weight based on the total weight of the reactive mixture, preferably from 0.01 to 0.5 and more preferably from 0.025 to 0.25 parts by weight.

Crosslinkers and/or chain extenders are typically present in small amounts (if at all). A preferred amount is from 0 to 5 pph of crosslinkers and/or chain extenders. A more preferred amount is from 0.05 to 2 pph and a still more preferred amount is from 0.1 to 1 pph of one or more crosslinkers.

Blowing agents are present in amounts sufficient to provide the desired foam density. When water is the blowing agent, a suitable amount is generally from 1.5 to 6 pph, preferably from 2 to 5 pph.

Catalysts are typically present in small amounts, such as up to 2 pph and generally up to 1 pph. A preferred amount of catalyst is from 0.05 to 1 pph.

Surfactants are typically present in amounts up to 5 pph, more typically from 0.1 to 2 pph and preferably from 0.25 to 1.5 pph.

The amount of polyisocyanate that is present is expressed as the "isocyanate index", which is 100 times the ratio of isocyanate groups to isocyanate-reactive groups in the foam formulation. The isocyanate index is typically from about 70 to 150. A preferred isocyanate index is from 80 to 125 and a more preferred isocyanate index is from 80 to 115. In some embodiments, the isocyanate index is from 90 to 115 or from 95 to 115.

Other ingredients may be present during the foaming step, including, for example, fillers, colorants, odor masks, flame retardants, biocides, antistatic agents, thixotropic agents and cell openers.

Polyurethane foam is made in accordance with this invention by forming a reaction mixture containing the various ingredients and curing the reaction mixture. Free-rise process such as continuous slabstock production methods can be used. Alternatively, molding methods can be used. Such processes are well known. Generally, no alternation of conventional processing operations is needed to produce polyurethane foam in accordance with this invention (other than the inclusion of the beta-diketo amine compound together with the antioxidant(s)).

The various ingredients may be introduced individually or in various subcombinations into a mix head or other mixing device where they are mixed and dispensed into a region (such as a trough or other open container, or a closed mold) where they are cured. It is often convenient to supply the polyacetoacetate compound in the form of a solution in water or other suitable solvent. Alternatively (or in addition), the polyacetoacetate compound may be mixed with the isocyanate-reactive compound(s) beforehand. It is often convenient, especially when making molded foam, to form a formulated polyol component that contains the isocyanate-reactive compound(s), including crosslinkers and/or chain extenders as may be used, the polyacetoacetate compound(s), the antioxidant(s) and optionally the catalyst(s), surfactant(s) and blowing agent(s). This formulated polyol component is then contacted with the polyisocyanate (as well as any other ingredients that are not present in the formulated polyol component) to produce the foam.

It is preferred to blend the polyacetoacetate compound with the isocyanate reactive compound(s) that have at least two isocyanate-reactive groups per molecule and an equivalent weight of at least 200 per isocyanate-reactive group, prior to forming the polyurethane foam and to maintain that blend at approximately room temperature or a higher temperature (but below the boiling temperature of the polyacetoacetate compound and below the temperature at which the polyol degrades) for a period of at least 30 minutes prior to making the foam.

Some or all of the various components may be heated prior to mixing them to form the reaction mixture. In other cases, the components are mixed at ambient temperatures (such as from 15-40° C.). Heat may be applied to the reaction mixture after all ingredients have been mixed, but this is often unnecessary.

The product of the curing reaction is a flexible polyurethane foam. The foam density may be from 20 to 200 kg/m$^3$. For most seating and bedding applications, a preferred density is from 24 to 80 kg/m$^3$. The foam may have a resiliency of at least 50% on the ball rebound test of ASTM 3574-H. Foams produced in accordance with this invention are useful, for example, in cushioning applications such as bedding and domestic, office or vehicular seating, as well as in other vehicular applications such as headrests, dashboards instrument panels, armrests or headliners.

Polyurethane foams made in accordance with the invention are characterized in having low formaldehyde and low acetaldehyde emissions. A suitable method for measuring formaldehyde and acetaldehyde emissions is as follows: The polyurethane foam sample is crushed to open the cells. The crushed foam is cut into 100 mm×80 mm×50 mm samples, which are immediately covered with aluminum foil and kept in this manner for 3 to 14 days at about 25° C. A polyvinyl fluoride (PVF) gas bag is used for aldehyde emission test. Before testing, the gas bags are heated in oven at 95° C. overnight, and washed with pure nitrogen three times before put foam samples in gas bag. A blank gas bag is employed as blank sample during the analysis. After the foam samples are put into gas bag, the gas bag is filled with nitrogen gas, and then heated in the oven for 2 hours at 65° C. After heating, the nitrogen gas from the gas bags are captured in a dinitrophenylhydrazine (DNPH) cartridge. The DNPH cartridge is then washed with solvent and the eluent is analyzed for aldehydes such as formaldehyde and acetaldehyde by liquid chromatography. Preferably, the formaldehyde and acetaldehyde emissions each are no greater than 70% of comparable sample, more preferably no greater than 50% of comparable sample, as measured according to this method. In one embodiment, the polyurethane foam made by the process of the present invention exhibits formaldehyde and acetaldehyde emissions each no greater than 1 μg for a 100 mm by 80 mm by 50 mm test piece.

The following examples are provided to illustrate the invention, but are not intended to limit the scope thereof. All parts and percentages are by weight unless otherwise indicated.

EXAMPLES

Preparation of 2,2-bis(((3-oxobutanoyl)oxy)methyl) propane-1,3-diyl bis(3-oxobutanoate)

2,2-bis(((3-oxobutanoyl)oxy)methyl)propane-1,3-diyl bis (3-oxobutanoate) has the following structure:

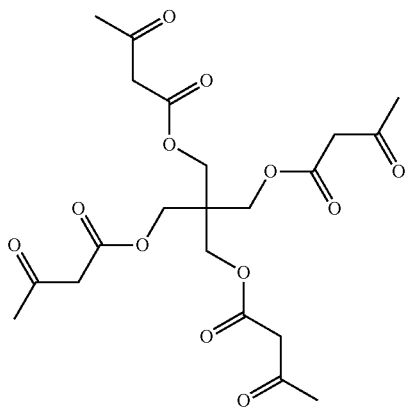 [SMILES: CC(=O)CC(=O)OCC(COC(=O)CC(C)=O)(COC(=O)CC(C)=O)COC(=O)CC(C)=O]

An excess tert-butyl acetoacetate (TBAA) of 170 g (1.08 mol) is added to 34 g of pentaerythritol (0.25 mol) and mixed together under a nitrogen purge. P-toluenesulfonic acid (catalyst, 1.7 g)) is added to the mixture which is then heated. The low boiling point side product, tert-butyl alcohol, condenses in a Dean-Stark tube. When no more alcohol is generated, the reaction is stopped. The crude product is then washed with brine for three times followed with distilled water. Then the product is vacuum dried firstly by rota-evaporation followed by vacuum dried at 45° C. in an oven for 4 hour.

For Examples 1 to 5 formulated A-side (comprising isocyanate and other additives) and B-side (polyol blend comprising polyols and other additives) are made from the components listed herein below, amounts are given in grams (g).

Polyol formulations are neat (i.e., without an polyacetoacetate (AA) and/or an antioxidant (AO)) or prepared by mixing with an polyacetoacetate or an polyacetoacetate and an antioxidant for 3 minutes at 3000 rpm to make sure the polyacetoacetate and antioxidant is well mixed with polyol. The polyols are stored at room temperature for 0 to 2 weeks before foaming experiment. After foaming, the foam samples are immediately covered with aluminum foil and kept at room temperature before being analyzed by a gas bag method.

In Table 1:

"Polyol-1" is a glycerine initiated propylene oxide and 15 percent ethylene oxide capped polyol having a hydroxyl number of 27.5 and an equivalent weight of 2040 available as VORANOL™ CP 6001 Polyol from The Dow Chemical Company;

"Polyol-2" is a grafted polyether polyol containing 40 wt % copolymerized styrene and acrylonitrile solids and an OH number of 22 mg KOH/g available as SPECFLEX™ NC-701 from The Dow Chemical Company;

"DEOA" is diethanolamine, a crosslinker, available from SCR Co., Ltd.;

"Glycerine" is a crosslinker available from SCR Co., Ltd.;

"TEDA" is a 33 percent triethylene diamine in dipropylene glycol curing catalyst is available as DABCO 33 LV from Air Products;

"TA/G" is a tertiary amine/glycol mixture available as C225 from Momentive Co., Ltd.;

"B 8727" is an organosilicone surfactant available TEGOSTAB B8727 LF2 by Evonik Industries/Goldschmidt Chemical Corporation;

"AO-1" is a butylated hydroxytoluene (BHT) and amine-free liquid heat stabilizer blend available as IRGASTAB™ PUR 68 from BASF (China) Co., Ltd;

"AO-2" is hindered phenolic primary antioxidant comprising a benzenepropanoic acid, 3,5-bis (1,1-dimethylethyl)-4-hydroxy-C7-C9 branched alkyl esters available as IRGANOX™ 1135 from BASF (China) Co., Ltd;

"AO-3" is sterically hindered primary phenolic antioxidant stabilizer available as IRGANOX 1076 from BASF (China) Co., Ltd:

"AO-4" is a 1:1:1 mixture of AO-1, AO-2, and AO-3;

"AA-1" is 2,2-bis(((3-oxobutanoyl)oxy)methyl)propane-1,3-diyl bis(3-oxobutanoate);

"PEI" is polyethyleneimine available as EPOMIN™ SP-600 from Nippon Shokubai Co., Ltd.;

"MDI" is a 3.2 functional polymeric MDI with 30.4% NCO and an isocyanate equivalent weight of 138 available as PAPI™ 27 Isocyanate from The Dow Chemical Company;

"TDI" is toluene diisocyanate having a functionality of 2 with an isocyanate equivalent weight of 87, available as VORANATE T-80 Type I TDI from The Dow Chemical Company; and "TM-20" is a mixture of 20% of MDI and 80% TDI by weight.

The compositions of Examples 1 to 5 are shown in Table 1.

Examples 1 to 5 are foamed by mixing an aliquot of 100 g of the polyol (B-side) with 28 g of TM-20 (A-side) to prepare the foam sample. After foaming, the foam sample is packaged with aluminum foil before analysis. The gas bag analysis is conducted within 7 days before foam sample is prepared.

Aldehydes emitted from the foam samples are analyzed by the following gas bag method: Sample Preparation. The foam samples (30 g, cut into cubicles) are put into a 10 L Tedlar gas bag (Delin Co. ltd, China) for analysis. The gas bag is washed with pure nitrogen three times before analysis, and a blank gas bag is employed as blank during the analysis. After the foam sample is put into the gas bag, the gas bag is filled with about 7 L of nitrogen gas, and then heated in the oven for 2 hours at 65° C. The nitrogen gas in the gas bag is then pumped out by an air pump for VOCs and carbonyls analysis.

TABLE 1

| B-Side | Example | | | | |
| --- | --- | --- | --- | --- | --- |
| | 1* | 2 | 3 | 4 | 5 |
| Polyol-1, g | 136.02 | 136.02 | 136.02 | 136.02 | 136.02 |
| Polyol-2, g | 150.33 | 150.33 | 150.33 | 150.33 | 150.33 |
| DEOA, g | 1.44 | 1.44 | 1.44 | 1.44 | 1.44 |
| Glycerine, g | 1.14 | 1.14 | 1.14 | 1.14 | 1.14 |
| TEDA, g | 0.81 | 0.81 | 0.81 | 0.81 | 0.81 |
| TA/G, g | 0.51 | 0.51 | 0.51 | 0.51 | 0.51 |
| B 8727, g | 3.45 | 3.45 | 3.45 | 3.45 | 3.45 |
| Water, g | 6.30 | 6.30 | 6.30 | 6.30 | 6.30 |
| AA-1, g | | 0.2 | 0.3 | 0.3 | 0.3 |
| PEI, g | | | 0.3 | | |
| AO-4, g | | | | | 0.45 |

*Not an example of the present invention

Analytical Method. For the aldehyde test, a DNPH cartridge (CNWBOND DNPH-Silica cartridge, 350 mg, Cat. No. SEEQ-144102, Anple Co., Ltd.) is employed to absorb the carbonyls emitted from the gas bag. The sampling speed is 330 mL/min and the sampling time is 13 min. After absorption, the DNPH cartridge is eluted with 3 g (precisely weight) of ACN, and the ACN solution is analyzed by HPLC to quantify the carbonyls in the sample. The standard solution with six DNPH derivatives (TO11A carbonyl-DNPH mix, Cat. No. 48149-U, 15 ppm for each individual compound, Supelco Co., Ltd) is diluted by acetonitrile and the final solution (0.794 ppm wt/wt) is restored in a 2 ml vial for instrument calibration at −4° C. (refrigerator). The 0.794 ppm (wt/wt) standard solution prepared is injected into the HPLC system as a one point external standard for quantification of carbonyls in the sample. The first two peaks are identified as formaldehyde and acetaldehyde according to the standard specification.

The response factor is calculated for each derivative according the formula below:

$$\text{Response factor } i = \frac{\text{Peak Area } i}{0.794}$$

where:
Response factor i=Response factor of derivative i
Peak Area i=Peak Area of derivative i in standard solution
0.794=standard concentration of 0.794 ppm The concentration of the aldehyde-DNPH derivative in the sample solution is calculated based on the formula below:

$$\text{Concentration of } i = \frac{\text{Peak Area } i}{\text{Response factor } i}$$

where:
Concentration of i=Concentration of aldehyde-DNPH derivative in sample solution
Peak Area i=Peak Area of Derivative i in sample solution
Response factor i=Response factor of derivative i The HPLC conditions are shown in Table 2:

TABLE 2

| Instrument: | Agilent 1200 HPLC | | | |
|---|---|---|---|---|
| Column: | Supelco Ascentis Express C18, 15 cm*4.6 mm, 2.7 um | | | |
| Mobile Phase: | Solvent A: 0.1% H3PO4 in Acetonitrile (ACN) | | | |
| | Solvent B: 0.1% H3PO4 in DI water | | | |
| Column Oven: | 15° C. | | | |
| Detection: | DAD detector at 360 nm | | | |
| Gradient: | Time (mn) | % A | % B | Flow (ml/min) |
| | 0 | 45 | 55 | 1 |
| | 7 | 45 | 55 | 1 |
| | 14 | 50 | 50 | 1 |
| | 20 | 85 | 15 | 1 |
| | 25 | 100 | 0 | 1 |
| Equilibration Time: | 5 min | | | |
| Injection: | 10 uL | | | |

The gas bag analysis results for aldehydes reduction for Examples 1 to 6 are shown in Table 3. Example 6 is just the gas bag with no sample.

As can be seen by the data presented in Table 3, the examples of the present invention are effective as aldehyde scavenger in polyol/foam product. Further, it is shown that the polyacetoacetate compound shows a synergic effect with antioxidants to abate aldehydes in polyol/foam product.

TABLE 3

| Example | Acetaldehyde, μg/m³ | Acrolein, μg/m³ |
|---|---|---|
| 1* | 139.2 | 48.4 |
| 2 | 67 | 19.6 |
| 3 | 83.2 | 29.2 |
| 4 | 44.86 | 17.28 |
| 5 | 0 | 0 |
| 6* | 45.4 | 0 |

*Not examples of the present invention

What is claimed is:

1. A method for reducing formaldehyde and acetaldehyde emissions from a polyurethane foam, comprising:

a) mixing an polyacetoacetate compound (i) and an antioxidant (ii) with at least one isocyanate-reactive material having an average functionality of at least 2 and an equivalent weight of at least 200 per isocyanate-reactive group and then b) combining the mixture from step a) with at least one aromatic polyisocyanate and curing the resulting combination in the presence of at least one blowing agent, at least one surfactant, and at least one catalyst to form a polyurethane foam, wherein the polyacetoacetate compound (i) has the following structure:

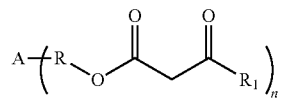

I wherein A is a polymer backbone, a $C_1$-$C_{20}$ substituted or unsubstituted linear or branched alkyl, aryl, arylalkyl, or alkaryl group wherein, if substituted, the substituted molecules may be one or more 0 or halogen;

R is a bond or $C_1$-$C_{30}$ linear or branched alkyl, aryl, arylalkyl, or alkaryl group or a substituted or unsubstituted ether moiety;

$R^1$ is a substituted or unsubstituted $C_1$-$C_6$ alkyl group or a substituted or unsubstituted aryl group;

and n is 2 to 100, and (ii) at least one antioxidant, wherein the antioxidant is at least one phenolic compound, wherein the polyacetoacetate compound is 2,2-bis (((3-oxobutanoyl)oxy)methyl)propane-1,3 diyl bis(3-oxobutanoate) and the antioxidant is a sterically hindered primary phenolic antioxidant.

2. A polyurethane foam made by the method of claim 1.

* * * * *